Nov. 27, 1945.  E. REY  2,389,742
SPECTACLE FRAME
Filed Feb. 1, 1944
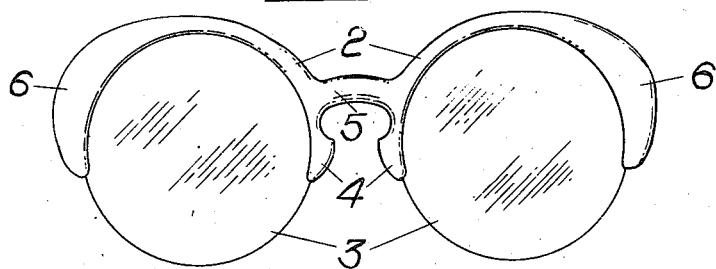
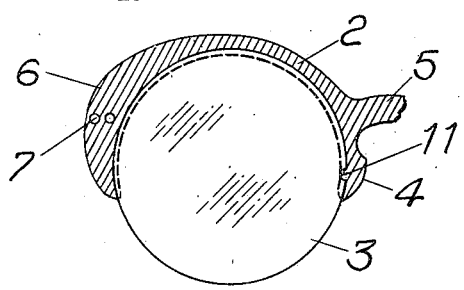
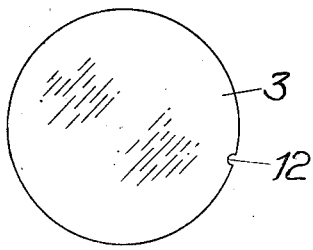
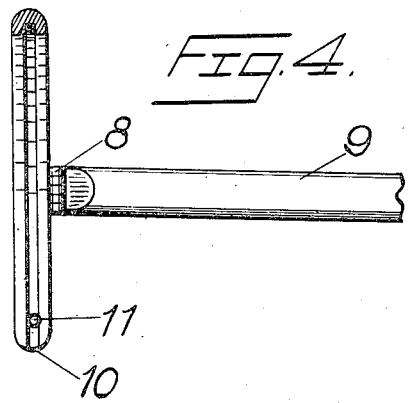
INVENTOR
Eudice Rey
BY
Wm. Wallace White
ATTORNEY Patented Nov. 27, 1945

2,389,742

UNITED STATES PATENT OFFICE 2,389,742

SPECTACLE FRAME

Eudice Rey, Brooklyn, N. Y., assignor to Zylo Ware Corporation, Long Island City, N. Y.

Application February 1, 1944, Serial No. 520,580

2 Claims. (Cl. 88—41)

This invention relates to improvements in spectacle frames, and more particularly to half-frame mountings of moulded-plastic or other non-metallic material.

One object of the invention is to provide an improved spectacle frame of novel form and construction such as to facilitate assembling of the lenses in the rim sections thereof and to assure the firm retention of the lenses against displacement after assembly. A further object is to provide a half-frame mounting of plastic material for spectacles which, while allowing of greater radius (slightly less than 180° with round lenses) of vision unobstructed by rims, is at the same time less conspicuous in appearance, lighter in weight, and the manufacture of which effects a saving in material over known types of such frames. A still further object incident to my invention is the elimination of the unsightly protruding knuckles commonly provided for attachment of the temple hinges, this particular object being attained by thickening the outer portions of the respective rims for another definite purpose hereinafter explained.

With these and other objects in view the invention consists in the novel construction of half-frame spectacles, as hereinafter described, illustrated in the accompanying drawing, and particularly pointed out in the appended claims, it being understood that various changes may be made in the form and construction of the frame without departing from the spirit of the invention or sacrificing any of the advantages thereof.

In the accompanying drawing,

Fig. 1 is a front elevation of my improved spectacle frame;

Fig. 2 is a view in longitudinal section of one of the half rims and lens of the same;

Fig. 3 is a lens blank; and,

Fig. 4 is an enlarged cross-section through the center of one rim section of the frame, with temple hinge and fragment of a temple attached.

Referring to the drawing, the spectacle frame of my improved invention formed of moulded plastic or other non-metallic material is of novel design, comprising half rims 2 adapted to securely grip the upper peripheral edges of lenses 3 for which purpose, when the lenses are round as shown, it is necessary that the rims extend only slightly more than half way around the said edges. The inner end portions of rims 2 have formed thereon the usual nose pads 4 and said rims are connected together by the usual nose bridge 5. The outer end portions of each rim 2 is thickened in width, as at 6, thus providing a good base for anchoring, by means of rivet pins 7, one member of a hinge 8 for a temple 9. As shown in Fig. 4, the rims 2 are each of channel construction in cross section, and the sides of the channel 10 is adapted to fit snugly the edge of a lens 3, thus to afford equalized support against displacement along both sides of the lens edge. To secure the lens 3 in fixed relation against turning in the rim 2, there may be formed in and crosswise of each channel 10 adjacent the inner end of the rim 2 a half-round-end lug 11, adapted to coöperate with a notch 12 formed in the lens 3, which notch constitutes the sole alteration which it is necessary to make in the lens blank.

For assembling the lenses 3 in the half rims 2, the usual procedure is followed, that is, the frame being subjected to heat becomes to a certain degree flexible, permitting of stretching each half-rim 2 apart a distance sufficient to insert a lens in the channel 10, the proper relation of the lens in said rim being indicated and thereafter maintained against turning movement by coöperation of the rim lug 11 in the lens notch 12. On cooling, the frame tends to return to its original moulded shape (as is customary, the diameter of the rims is figured slightly less than that of the lenses intended to be fitted therein, so that a very snug fit is assured) and the lenses are thus securely gripped and held against displacement and turning movement by the rims, as by pairs of tongs. It will be apparent from the foregoing that because of their thickened construction the outer end portions 6 of the half rims, even when subjected to heat as explained, will be relatively less flexible than the inner end portions of said rims and that on cooling the same relation will obtain. In case of shock as by accidental dropping of the spectacles and consequent flexing of the inner rim portions, the lugs 11 serve as an added element of safety against dislodgement of the lenses.

Although the drawing and the above specification disclose the best mode in which I have contemplated embodying my invention, I desire to be in no way limited to the constructional details disclosed (particularly as to the contour of lenses used and to which contour the rims must in consequence conform), for in the further practical application of my invention many changes may be made in the construction, arrangement, and dimensions as circumstances require or experience suggests without departing from the spirit of the invention within the scope of the appended claims.

What I claim is:

1. In a pair of spectacles of the character described, a pair of lenses, a moulded frame of resilient plastic material comprising two arch-shaped rim members, a groove extending along the entire length of the under surface of each rim member for engagement with the edges of the upper portions of the lenses, each arch member embracing the upper part of a lens and extending downwardly on both side edges of the lens to points below the line of maximum horizontal width of the lens to grip the edges of the lens and retain the lens by the inherent resilience of the plastic material of the arch, an integral bridge piece connecting the adjacent parts of said arches, an integral nose pad formed at the inner extremity of each arch, the said bridge piece and nose pads serving to thicken and stiffen the arches at their inner portions, and a thickened and stiffened portion near the outer extremity of each arch so that the arch members are more resilient at their medial portions than at their extremities and such extremities are thus capable of acting as spring tongs to receive the lenses and to hold the latter firmly in place.

2. In a pair of spectacles according to claim 1, the combination of temples hinged to the back of the thickened portions near the outer extremities of the arch members.

EUDICE REY.